United States Patent
B et al.

(10) Patent No.: US 10,407,179 B2
(45) Date of Patent: Sep. 10, 2019

(54) AIRCRAFT SYSTEMS AND METHODS FOR DISPLAYING WIND SHEAR

(71) Applicant: HONEYWELL INTERNATIONAL INC., Morris Plains, NJ (US)

(72) Inventors: Jayasenthilnathan B, Karnataka (IN); Saravanakumar Gurusamy, Tamil Nadu (IN); Madhava Gadicherla, Karnataka (IN); Roger Burgin, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 288 days.

(21) Appl. No.: 15/294,978

(22) Filed: Oct. 17, 2016

(65) Prior Publication Data

US 2018/0105284 A1    Apr. 19, 2018

(51) Int. Cl.
| | |
|---|---|
| B64D 43/00 | (2006.01) |
| G08G 5/00 | (2006.01) |
| G01C 23/00 | (2006.01) |
| G01S 7/20 | (2006.01) |
| G01S 7/51 | (2006.01) |
| G01W 1/00 | (2006.01) |

(52) U.S. Cl.
CPC ............. *B64D 43/00* (2013.01); *G01C 23/00* (2013.01); *G01S 7/20* (2013.01); *G01S 7/51* (2013.01); *G01W 1/00* (2013.01); *G08G 5/0091* (2013.01)

(58) Field of Classification Search
CPC ........... B64D 43/00; G01C 23/00; G01S 7/20; G01S 7/51; G01W 1/00; G08G 5/0091
USPC ............................................................. 701/14
See application file for complete search history.

(56) References Cited

U.S. PATENT DOCUMENTS

| | | | |
|---|---|---|---|
| 3,618,002 A | * | 11/1971 | Stinson ................. G05D 1/0615 244/184 |
| 4,965,573 A | | 10/1990 | Gallagher et al. |
| 5,523,759 A | | 6/1996 | Gillberg et al. |

(Continued)

OTHER PUBLICATIONS

Airbus; Flight Operations Briefing Notes; Adverse Weather Operations Windshear Awareness; FOBN Reference : FLT_OPS—ADV_WX—SEQ 02—REV 03—Oct. 2007.

(Continued)

*Primary Examiner* — Anne M Antonucci
*Assistant Examiner* — James E Stroud
(74) *Attorney, Agent, or Firm* — Lorenz & Kopf, LLP

(57) ABSTRACT

A vehicle system includes a control unit with a weather module configured to receive weather data and to identify a wind shear zone at a location based on the weather data, the weather module further configured to generate wind shear coordinate data and wind shear characteristic data based on the weather data. The control unit further includes a display module configured to generate display commands based on the wind shear coordinate data and wind shear characteristic data from the weather module. The vehicle system further includes a display device coupled to receive the display commands from the control unit and configured to display a three-dimensional forward perspective view corresponding to a vehicle environment. The display device is further configured to display first wind shear symbology within the view at a position that indicates the location of the wind shear zone.

15 Claims, 3 Drawing Sheets

(56) References Cited

U.S. PATENT DOCUMENTS

| | | | |
|---|---|---|---|
| 6,700,482 B2* | 3/2004 | Ververs | G01C 23/00 |
| | | | 340/500 |
| 7,427,943 B1 | 9/2008 | Kronfeld et al. | |
| 7,724,177 B2 | 5/2010 | Bunch et al. | |
| 8,477,062 B1 | 7/2013 | Kanellis | |
| 8,847,794 B2* | 9/2014 | Buratto | G08G 5/0091 |
| | | | 340/971 |
| 9,658,328 B1* | 5/2017 | Sperling | G01S 13/953 |
| 2002/0039070 A1 | 4/2002 | Ververs et al. | |
| 2003/0025714 A1 | 2/2003 | Ebersole et al. | |
| 2003/0222795 A1 | 12/2003 | Holforty et al. | |
| 2009/0177343 A1 | 7/2009 | Bunch et al. | |
| 2010/0332056 A1 | 12/2010 | Kirk | |
| 2013/0249712 A1 | 9/2013 | Buratto et al. | |
| 2014/0331161 A1 | 11/2014 | Venkataswamy et al. | |
| 2016/0011741 A1 | 1/2016 | Khatwa et al. | |
| 2016/0019798 A1 | 1/2016 | Agrawal | |

OTHER PUBLICATIONS

Rouwhorst, et al.; Piloted Evaluation of Flight Director Go-Around Modes and Windshear Icon Concepts; American Institute of Aeronautics and Astronautics, Inc. A98-37235; Copyright 1998.
Extended EP Search Report for Application No. 17195567.7 dated Feb. 21, 2018.

* cited by examiner

AIRCRAFT SYSTEMS AND METHODS FOR DISPLAYING WIND SHEAR

TECHNICAL FIELD

The present invention generally relates to aircraft display systems, and more particularly relates to aircraft systems and methods for displaying weather information.

BACKGROUND

Modern flight deck or cockpit displays for aircraft or other vehicles provide a considerable amount of information, such as vehicle position and navigation information. In the case of an aircraft, a primary flight display may include synthetic or enhanced views of the surrounding environment and various types of operating information, such as terrain information, political boundaries, navigation aids, air traffic information, waypoint symbols, flight paths, range rings, and the like. Some displays may include weather information. However, weather information presented on conventional displays may not include all conditions that are relevant to flight.

Accordingly, it is desirable to provide more complete and relevant weather information to the user in an intuitive manner to improve situational awareness and decrease pilot workload. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a vehicle system includes a control unit with a weather module configured to receive weather data and to identify a wind shear zone at a location based on the weather data, the weather module further configured to generate wind shear coordinate data and wind shear characteristic data based on the weather data. The control unit further includes a display module configured to generate display commands based on the wind shear coordinate data and wind shear characteristic data from the weather module. The vehicle system further includes a display device coupled to receive the display commands from the control unit and configured to display a three-dimensional forward perspective view corresponding to a vehicle environment. The display device is further configured to display first wind shear symbology within the view at a position that indicates the location of the wind shear zone.

In accordance with another exemplary embodiment, a vehicle system includes a control unit with a weather module configured to receive weather data and to identify a wind shear zone at a location based on the weather data, the weather module further configured to generate wind shear coordinate data and wind shear characteristic data based on the weather data, and a response module coupled to the weather module and configured to generate autopilot commands based on wind shear coordinate data and wind shear characteristic data. The vehicle system further includes an autopilot system coupled to the response module and configured to generate vehicle actuator commands based on the autopilot commands.

In accordance with another exemplary embodiment, a vehicle system includes a control unit with a weather module configured to receive weather data and to identify a wind shear zone at a location based on the weather data, the weather module further configured to generate wind shear coordinate data and wind shear characteristic data based on the weather data, and a display module configured to generate display commands based on the wind shear coordinate data and wind shear characteristic data from the weather module. The system further includes a display device coupled to receive the display commands from the control unit and configured to display a vertical situation display view that includes a horizontal axis representing distance, a vertical axis representing altitude, and first wind shear symbology along the horizontal axis and the vertical axis at a position that indicates the location of the wind shear zone.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to systems and methods for displaying flight information to a pilot or user. In some exemplary embodiments, the systems and methods display weather information to the user, particularly wind shear zones along the flight path on vertical and/or three-dimensional perspective displays. Accordingly, the user may have immediate and accurate flight information to address wind shear conditions.

Generally, the term "wind shear" (or "microburst") refers to a relatively drastic, sudden change in wind direction or speed over a relatively short distance in the atmosphere. If unaddressed or unconsidered, wind shear may impact aircraft operation, for example by losing and gaining altitude and/or speed. Generally, the term "wind shear zone" is a localized collection of wind shear activity and may be considered to include lateral and vertical dimensions, as well as other characteristics, as described in greater detail below. Exemplary embodiments discussed below provide advance alerting and awareness of wind shear zones to enable crew and/or autopilot intervention, as necessary or desired.

Figure 1:
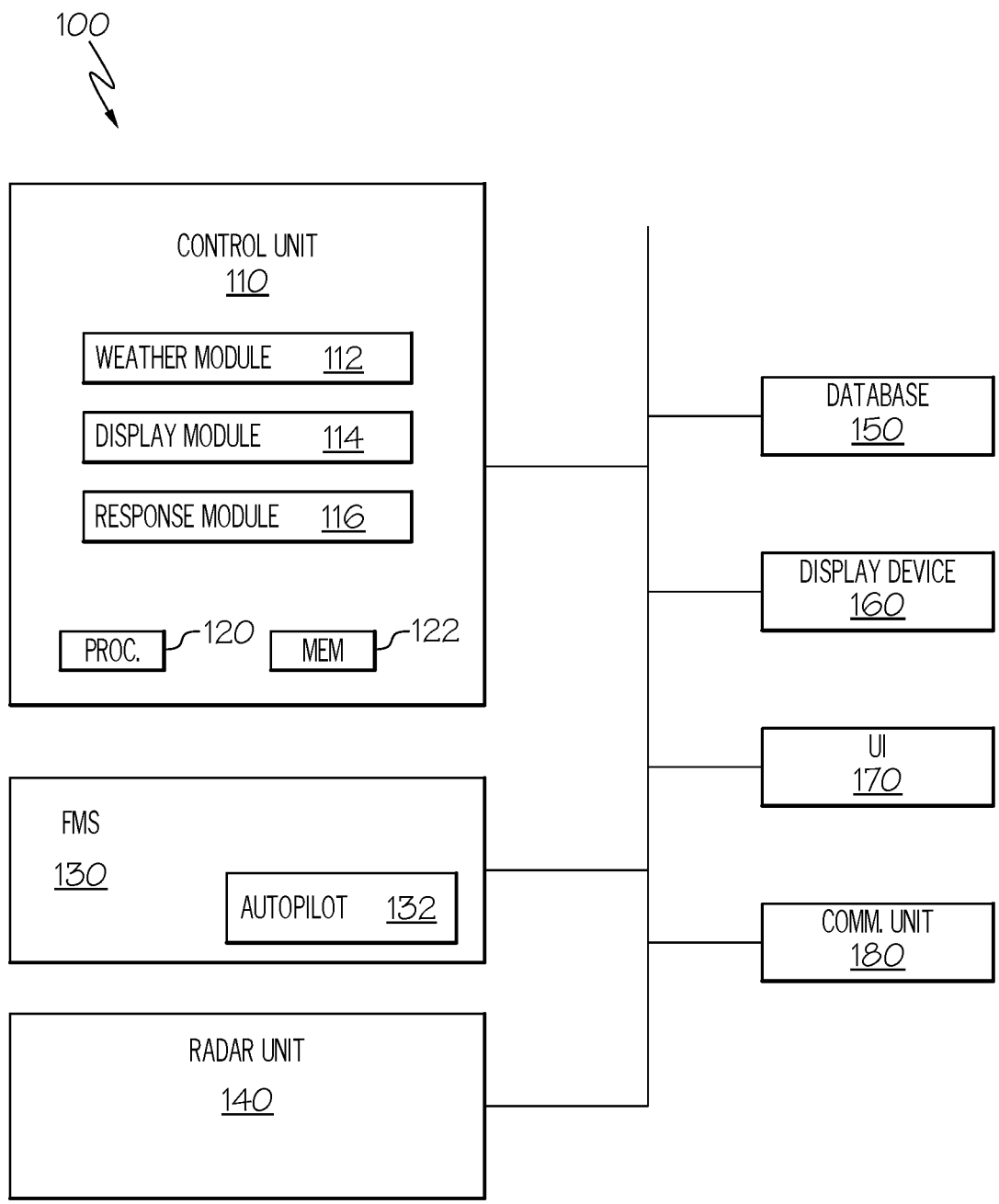
FIG. 1 is a block diagram of an aircraft system in accordance with an exemplary embodiment.

FIG. 1 depicts a block diagram of an exemplary aircraft system 100 for evaluating and displaying various types of flight information. In the exemplary embodiment shown, the aircraft system 100 includes a control unit 110, a flight management system 130, a radar unit 140, a database 150, a display device 160, a user interface 170, and a communications unit 180. Although the system 100 appears in FIG. 1 to be arranged as a single system on a data communications bus or systems bus, the system 100 is not so limited and can also include an arrangement whereby one or more of the control unit 110, flight management system 130, radar unit 140, database 150, display device 160, user interface 170, and communications unit 180 are separate components or subcomponents of another system located either onboard or external to an aircraft. The system 100 may be utilized in an aircraft, such as a helicopter, airplane, or unmanned vehicle. Moreover, exemplary embodiments of the system 100 may also be utilized in spacecraft, ships, submarines, and other types of vehicles. For simplicity, embodiments are described below with reference to "aircraft."

Generally, the control unit 110 controls the function and operation of the system 100, and particularly manages the collection, evaluation, and display of, and/or the response to, weather information such as wind shear, as described in greater detail below. The control unit 110 may be considered to include one or more functional units or modules 112, 114, and 116 (e.g., software, hardware, or combinations thereof). As an example, each of the modules 112, 114, and 116 may be implemented by with a processor 120 and memory 122. In the depicted embodiment, the control unit 110 includes a weather module 112, a display module 114, and a response module 116. FIG. 1 depicts one exemplary organization, and other embodiments may perform similar functions with alternative organization or implementation. Additional details about operation of these modules 112, 114, 116 will be provided below.

In one exemplary embodiment, the control unit 110 may be associated with a primary flight display, a vertical display, near-to-eye display system, or other type of aircraft display. During general operation, the control unit 110 receives and/or retrieves inertial, avionics, navigation and flight management information, including weather information, (e.g., from the flight management system 130, radar unit 140, database 150, and/or communications unit 180), and landing, target and/or terrain information (e.g., from database 150). The control unit 110 may function as a graphics display generator to generate display commands with algorithms or other machine instructions stored in the memory 122 or in separate memory components. The display commands are provided to the display device 160 for display to the user and may represent navigation, control and flight information such as the surrounding environment, heading indicators, tapes for airspeed and altitude, terrain information, flight path information, and any other information desired by a flight crew. As discussed in further detail below, the weather module 112 generally receives and evaluates the weather information from various systems, and the display module 114 generates and sends appropriate display commands representing weather information to the display device 160 for display with the other flight information. In some instances, the response module 116 may command the autopilot or other systems based on the weather information. More specific functions of the will be discussed below.

In one exemplary embodiment, the control unit 110 may be associated with, or include, a Synthetic Vision Systems (SVS) or an Enhanced Vision System (EVS). Generally, an SVS is configured to generate a three-dimensional image that shows the topographical environment through which the aircraft is flying. Generally, an EVS receives and processes camera and/or sensor data to form an image displayed to the pilot. In some embodiments, a combined SVS and EVS is configured to correlate or register the images from the SVS and EVS, combine the images, and facilitate display of the resulting image.

As noted above, the control unit 110 (as well as other components of system 100) may be implemented with a computer processor 120, including general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processor 120 may execute instructions stored in memory 122 to carry out the functions, techniques, and processing tasks or methods associated with operation of the control unit 110. The memory 122 may store computer readable instructions, firmware and software programs and be tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

The flight management system 130 is coupled to the control unit 110 and may provide navigation data associated with the aircraft's current position and flight direction (e.g., heading, course, track, etc.) to the control unit 110. The navigation data may also include information about the aircraft's airspeed, altitude, pitch, flight path, intended destination, takeoff and landing information, and other important flight information. In one embodiment, the flight management system 130 may generate a flight plan for the aircraft that includes segments between waypoints forming a flight path to a destination. The flight management system 130 may include any suitable position and direction determination devices that are capable of providing relevant flight information, including systems and devices such as, for example, an Inertial Reference System (IRS), Air-data Heading Reference System (AHRS), and/or a global positioning system (GPS), as well as various types of altitude sensors, attitude sensors, terrain sensors, and other types of ranging sensors. As shown, the flight management system 130 may also be considered to include an autopilot system 132. The autopilot system 132 may include control rules and algorithms to operate one or more aspects of the aircraft based on information from the aircraft systems. In one example, the autopilot system 132 may generate actuator or other type of equipment commands to modify the speed, position, altitude, attitude, or other aircraft or flight characteristics.

In one exemplary embodiment, radar unit 140 may include one or more of an antenna, receiver, transmitter, and radar controller. In such an example, under the control of radar controller and based on based on aircraft data (e.g., position, heading, roll, yaw, pitch, and the like), the transmitter is configured to generate and transmit radar signals from antenna into airspace proximate the aircraft, and the receiver is configured to receive, via antenna, return signals (e.g., reflectivity values) if a weather object is present to scatter energy back to the receiver. Such weather objects may include, for example, occurrences of wind shear. An occurrence of wind shear may be considered a wind shear zone, as described in greater detail below. In some examples, the radar controller digitizes the return signals and sends the digitized signals to control unit 110 for processing and/or storage in the database 150.

Database 150 is coupled to control unit 110 and may be a memory device (e.g., non-volatile memory, disk, drive, tape, optical storage device, mass storage device, etc.) that stores digital flight information as either absolute coordinate data or as a function of an aircraft's position. Database 150 may also include, for example, a terrain database, which includes the locations and elevations of natural and man-made terrain. Database 150 may additionally include other types of information, such as information relating to the aircraft and/or weather information. The data may be used to compare aircraft position with various aspects of the flight plan and terrain environment to subsequently generate a synthetic view relative to the aircraft, as discussed below. Data in the database 150 may be uploaded prior to flight or received from external sources, such as an airport transmitter or onboard sensors. Database 150 may further include aircraft data obtained from the Federal Aviation Administration (FAA) and aircraft manufacturers, such as from aircraft flight manual. The aircraft data may also include aircraft characteristics as a function of, for example, aircraft weight, with corrections based on, for example, wind direction, runway slope, runway surface condition, atmospheric altitude and outside temperature. In one exemplary embodiment, the database 150 may store or otherwise access weather information in a three-dimensional or volumetric memory buffer or secondary buffer, as described below. In some embodiments, such a volumetric memory and/or secondary buffer may be considered part of the radar unit 140.

The display device 160 is coupled to the control unit 110 and may include any device or apparatus suitable for displaying flight information or other data associated with operation of the aircraft, including various types of computer generated symbols and information representing at least weather, pitch, heading, flight path, airspeed, altitude, runway information, waypoints, targets, obstacle, and terrain data in an integrated, multi-color or monochrome form. The display device 160 and/or control unit 110 may include a graphics display generator for generating the appropriate symbology on the screen of the display device 160, as discussed in greater detail below. In this embodiment, the display device 160 is an aircraft flight display located within a cockpit of the aircraft. It should be appreciated that, in practice, the display device 160 may be located outside the aircraft (e.g., on the ground as part of an air traffic control center or another command center). Any suitable type of display medium capable of visually presenting multi-colored or monochrome flight information for a pilot or other flight crew member may be provided, such as, for example, various CRT, flat-panel, and other types of display systems (e.g., LCDs, OLED displays, plasma displays, projection displays, HDDs, HUDs, etc.).

The user interface 170 is coupled to the control unit 110 and may also be located within the cockpit of the aircraft and adapted to allow a user (e.g., pilot, co-pilot, or crew member) to interact with the system 100. Such a user interface may be realized as a keypad, touchpad, keyboard, mouse, touchscreen, joystick, microphone, or another suitable device adapted to receive input from a user.

The communications unit 180 may be any suitable device for sending and receiving information to and from the control unit 110. In some embodiments, communications unit 180 may be configured to receive radio frequency transmissions, satellite communication transmissions, optical transmissions, laser light transmissions, sonic transmissions or transmissions of any other wireless form of data link. The communications unit 180 may be, for example, a datalink unit that provides, among other information, weather data through an XM WX satellite weather datacasting service or other type of weather service. The communications unit 180 may also communicate with a control center, such as Air Traffic Control (ATC), to request clearances and/or modifications to the flight plan.

As introduced above, the system 100 functions to collect, evaluate, and present flight information to a user, including weather information. In one exemplary embodiment, the system 100 particularly functions to collect, evaluate, and present wind shear information to a user. For example, the weather module 112 may receive or otherwise access the weather objects corresponding to wind shear from a volumetric buffer in database 150. As noted above, data associated with weather information, including wind shear data, may be collected by the radar unit 140, as well as from other sources, such as the communications unit 180 and/or the flight management system 130. Accordingly, the weather module 112 may identify wind shear zones from the weather data. In one exemplary embodiment, for each wind shear zone, the weather module 112 may be able to access or otherwise derive various types of wind shear information stored in the database 150, including coordinate data representing the size and location of the wind shear zone; characteristic data representing the nature of the wind shear zone, such as the local directions and magnitudes of the air flows that make up the wind shear zone; and prediction data representing anticipated coordinate and characteristics data.

In one exemplary embodiment, the radar unit 140 and/or weather module 112 may identify and/or evaluate weather and wind shear information as follows. For example, the radar unit 140 may send a normal pulse stream to detect weather phenomenon, followed by a secondary pulse stream to detect wind shear. The radar unit 140 may modulate the secondary pulses to detect the direction and speed of particles (water vapor, dust, etc.) in an air pocket. Upon receipt, the radar unit 140 may compare each subsequent secondary pulse scan with the previous pulse scan to quantify and detect the change in wind velocity. For example, in a typical wind shear occurrence, the direction and velocity of the air pocket would be significantly different across subsequent cross sections of air. As such, the radar unit 140 may have a model or profiler that identifies these changes in direction and velocity as a wind shear zone. Further, as the radar unit 140 scans a wind shear occurrence, the radar unit 140 detects air particles moving toward it at one range and away from it at a slightly greater range. The difference in the range between the particles moving towards and away may be considered the width of the base of the wind shear zone. Similarly, the consideration of vertical movement may determine the vertical height, and a severity of the wind shear zone may be indicated by the speed the particles. As noted above, this evaluation may occur by comparing the collected data in a volumetric or secondary buffer associated with the radar unit 140 and/or the database 150. Additional information may be provided ARINC 708A-3 and RTCA DO-220, each of which is hereby incorporated by reference in entirety. Upon identification of a wind shear zone, the location and characteristics are tagged and stored in database 150 and/or provided to the weather module 112.

As noted above, the weather module 112 retrieves weather information, including information associated with the wind shear zones from the database 150 and/or radar unit 140. Upon retrieval, the weather module 112 evaluates the coordinate data for the wind shear zones and converts the stored coordinate data into latitude, longitude, and altitude coordinates. In some instances, the coordinate data for the wind shear zones may be stored as latitude, longitude, and altitude coordinates.

The weather module 112 further evaluates the wind shear zone coordinates relative to aircraft or flight information received from the flight management system 130. As an example, based on information from the flight management system 130, the weather module 112 may determine the relative distances between the aircraft and the wind shear zones as distance coordinates. The weather module 112 may also determine whether or not the locations of the wind shear zones are along the intended flight path of the aircraft. In one exemplary embodiment, the weather module 112 continues to evaluate all wind shear zones within a current view of the aircraft. In other embodiments, the weather module 112 only continues to evaluate wind shear zones along the flight path.

The weather module 112 provides the distance coordinates and characteristic data for the wind shear zones to the display module 114. The display module 114 generates display commands to provide the information associated with the wind shear zones to the user on the display device 160. For example, the display module 114 generates graphical symbology representing the wind shear zones for display with the other aircraft and flight information presented to the user, as described in greater detail below.

In some embodiments, the weather module 112 may also provide the distance coordinates and characteristic data for the wind shear zones to the response module 116. In one exemplary embodiments, the response module 116 determine if flight characteristics should be modified in view of the wind shear zones, for example, if a wind shear zone has characteristics that may adversely impact flight. Other considerations may include the nature of the modifications, such as whether or not the flight plan may be modified. In one exemplary embodiment, the response module 116 may generate autopilot commands that represent one or more evasive actions or maneuvers to avoid or mitigate the impact of the wind shear zones on the aircraft. Such autopilot commands may include target speeds, target altitudes, fly-to-zones, and/or equipment modifications. Such commands are provided to the autopilot system 132 for implementation. Additionally, autopilot annunciations may be provided to the display device 160 for presentation to the user. Additional information regarding presentation of the wind shear information to the user is provided below in descriptions of FIGS. 2 and 3.

Figure 2:
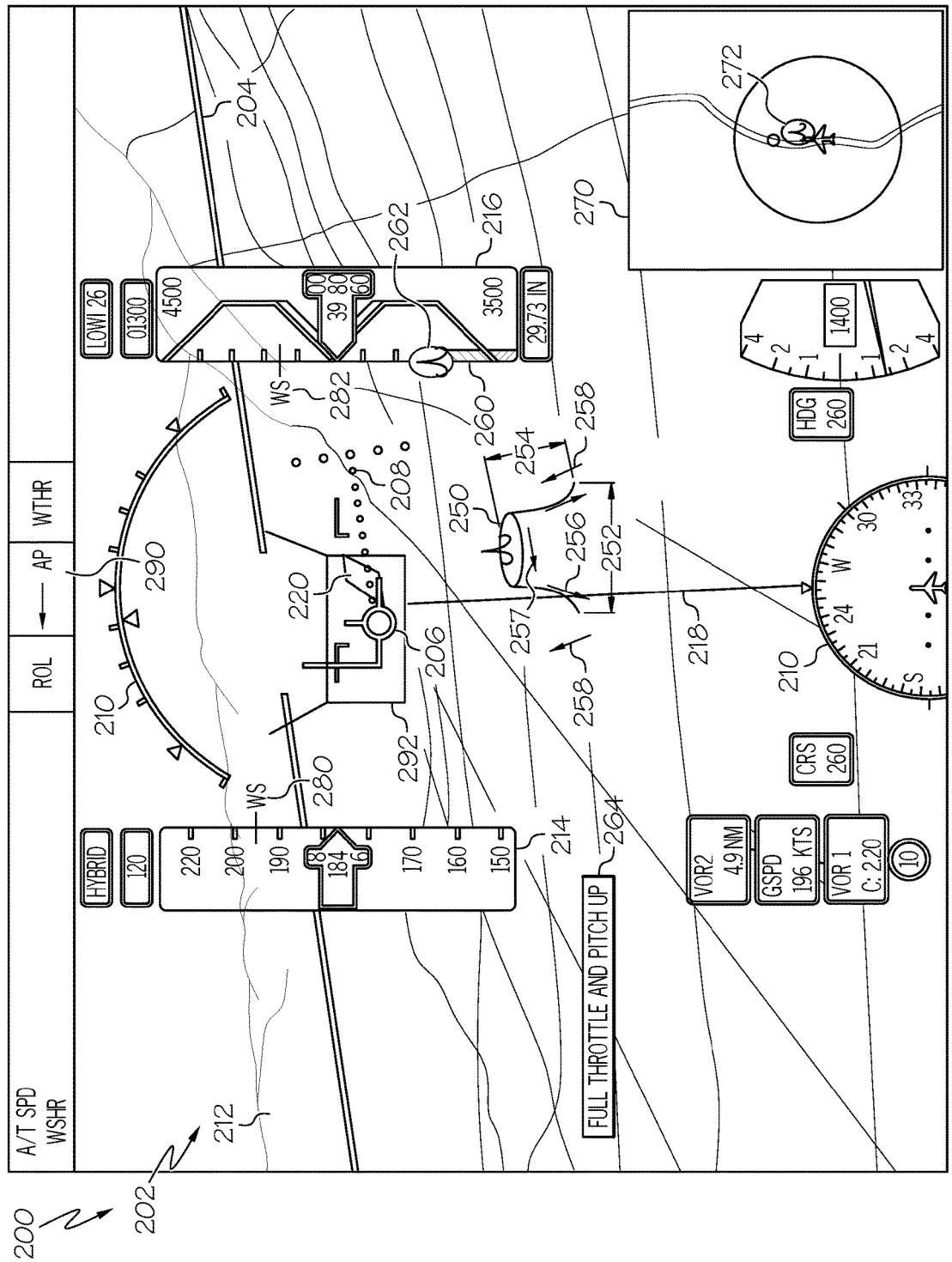
FIG. 2 is a first representative visual display generated by the aircraft system of FIG. 1 in accordance with an exemplary embodiment.

FIG. 2 is a visual display 200 generated by the system 100 of FIG. 1 in accordance with a first exemplary embodiment. As such, FIG. 1 is referenced in the discussion of FIG. 2 below. The visual display 200 may be produced, for example, on the display device 160 based on signals from the control unit 110 and other aircraft systems.

As shown, FIG. 2 depicts an exemplary visual display 200 in the form of a three-dimensional synthetic perspective view 202 of the real-time aircraft operating environment of the type presented on a primary flight display. As described above, the position and appearance of the images and other symbology on the visual display 200 may be dynamically generated by the control unit 110. In the depicted exemplary embodiment, the display 200 shows, among other things, computer generated symbols representing a zero pitch reference line (e.g., commonly referred to as a horizon line) 204, a flight path marker (also known as a flight path vector or velocity vector) 206, attitude indicator 208, horizontal situation indicator 210, terrain (e.g., identified generally as element 212), airspeed indicator 214, and altitude indicator 216. Generally, the terrain 212 can include any representation of the environment surrounding the aircraft, including other aircraft or ships. In this view, the aircraft is flying along a flight path 218 to an airport 220, which are also represented by symbology. Additional information may be provided on the display 200, including additional or alternative representations of various aircraft or flight conditions. Although the display 200 is shown as an egocentric, first-person frame of reference, the display 200 can be a secondary, wingman, and/or plan or perspective view that enables a viewer to view the aircraft, as well as zoom in and out.

In one exemplary embodiment and as introduced above, the visual display 200 may include symbology representing wind shear. In particular, the visual display 200 may include an icon 250 representing a wind shear zone identified by the control unit 110. The position of the icon 250 represents the position of the wind shear zone relative to the terrain 212, thereby providing an indication of the wind shear zone relative to the relative to the aircraft and the flight path 218. In the depicted exemplary embodiment, the wind shear icon 250 is generally conical, although other shapes may be presented.

In addition to position, the wind shear icon 250 may also be sized to reflect the size of the wind shear zone relative to the terrain 212. In particular, the diameter 252 of the icon 250 may reflect the horizontal extent of the wind shear zone, and the height 254 of the icon 250 may represent the altitude of the wind shear zone. In some embodiments, the wind shear icon 250 may have a color that reflects the threat of the wind shear zone to the aircraft. For example, the wind shear icon 250 may be colored yellow if the wind shear zone presents an advisory condition for the aircraft (e.g., such that a flight plan modification or equipment modification may be desired) or may be colored red if the wind shear zone presents a warning condition for the aircraft (e.g., such that a flight plan modification or equipment modification is required).

Additional wind shear symbology may include arrows 256, 257 indicating local air flow direction. As such, the arrows 256, 257 represent the local flow direction of the air that makes up the wind shear zone to, in effect, provide characteristic information for the wind shear zone. Generally, arrows 256 represent a vertical wind shear zone in which the volume of air is moving up or down (e.g., from high to low in the depicted example), and arrow 257 represents a horizontal wind shear zone in which the volume of air is moving side to side (e.g., from right to left in the depicted example). Of course, the wind shear zone may include both vertical and horizontal characteristics, as depicted, and/or the wind shear zone may be primarily vertical or horizontal or neither, and one or both of the arrows 256, 257 may be omitted as appropriate, depending on the nature of the wind shear zone. Further, the wind shear symbology may include arrows 258 representing a prediction regarding the future position of the wind shear zone. As such, the prediction arrows 258 provide an indication regarding the future path of travel for the wind shear zone. As noted above, this information may be derived from wind shear information collected by the radar unit 140 that enables the radar unit 140 and/or weather module 112 to evaluate the speed and direction of the particles that form the wind shear zone. For example, the weather module 112 may continuously monitor the wind shear zone over time to make predictions about the future position or characteristics.

Wind shear symbology may also be incorporated into the other types of flight information presented on the visual display 200. For example, icons 260, 262 representing wind shear altitude may be incorporated into the altitude indicator 216. In one embodiment, the altitude icon 260 may be a bar extending over the altitude range corresponding to the wind shear zone. In another embodiment, the altitude icon 262 is in the form of a visual icon or symbol that is immediately recognizable as wind shear. The altitude icon 260 enables immediate recognition for a user of the altitude of the wind shear zone relative to the aircraft.

Alert symbology 264 associated with the wind shear zone may further be incorporated into the visual display 200. In the depicted embodiment, the alert symbology 264 is in the form of a text alert providing information regarding suggested control operations based on the wind shear zone, e.g., "Full Throttle and Pitch Up."

Further symbology associated with the wind shear zone include icons 280, 282 representing target airspeed and target altitude, respectively, on the altitude and airspeed indicators 214, 216 for avoiding the wind shear zone. As noted above, the system 100 may also use an autopilot system 132 to avoid or mitigate the impact of the wind shear zone on the aircraft. In such a scenario, symbology may be presented to the user on the display 200. For example, autopilot annunciations 290 may be presented in the flight director modes area (e.g., "WSHR") to indicate an autopilot and auto-throttle coupled wind shear evasive maneuver. Further, fly-to-zones symbology 292 similar to that used in a TCAS maneuver may also be presented upon identification of a wind shear zone. Any suitable type of message alerts may be presented in a manner typical of annunciations in PFD, map, and/or VSD displays.

In addition to the perspective view 202, the visual display 200 may further include a lateral situation view 270, which in this example is inserted in a corner position relative to the perspective view 202. The lateral situation view 270 is centered on the aircraft and provides an indication of the lateral position of the aircraft. In this exemplary embodiment, the lateral situation view 270 includes a lateral wind shear icon 272 that indicates the lateral position of the wind shear zone relative to the aircraft. In some embodiments, a lateral wind shear icon similar to icon 272 may also be positioned in the compass of perspective view 202 of the visual display 200.

Although various examples of wind shear symbology are presented in FIG. 2, any suitable type or manner of symbology may be used to provide information regarding wind shear. In various embodiments, one or more of the types of wind shear symbology may be omitted and/or supplemented. Additionally, although an exemplary type of display 200 is presented in FIG. 2, similar or analogous symbology may be provided on other types of displays, including INAV displays, map displays, helmet mounted displays, near-to-eye displays, windshield displays, and the like.

Figure 3:
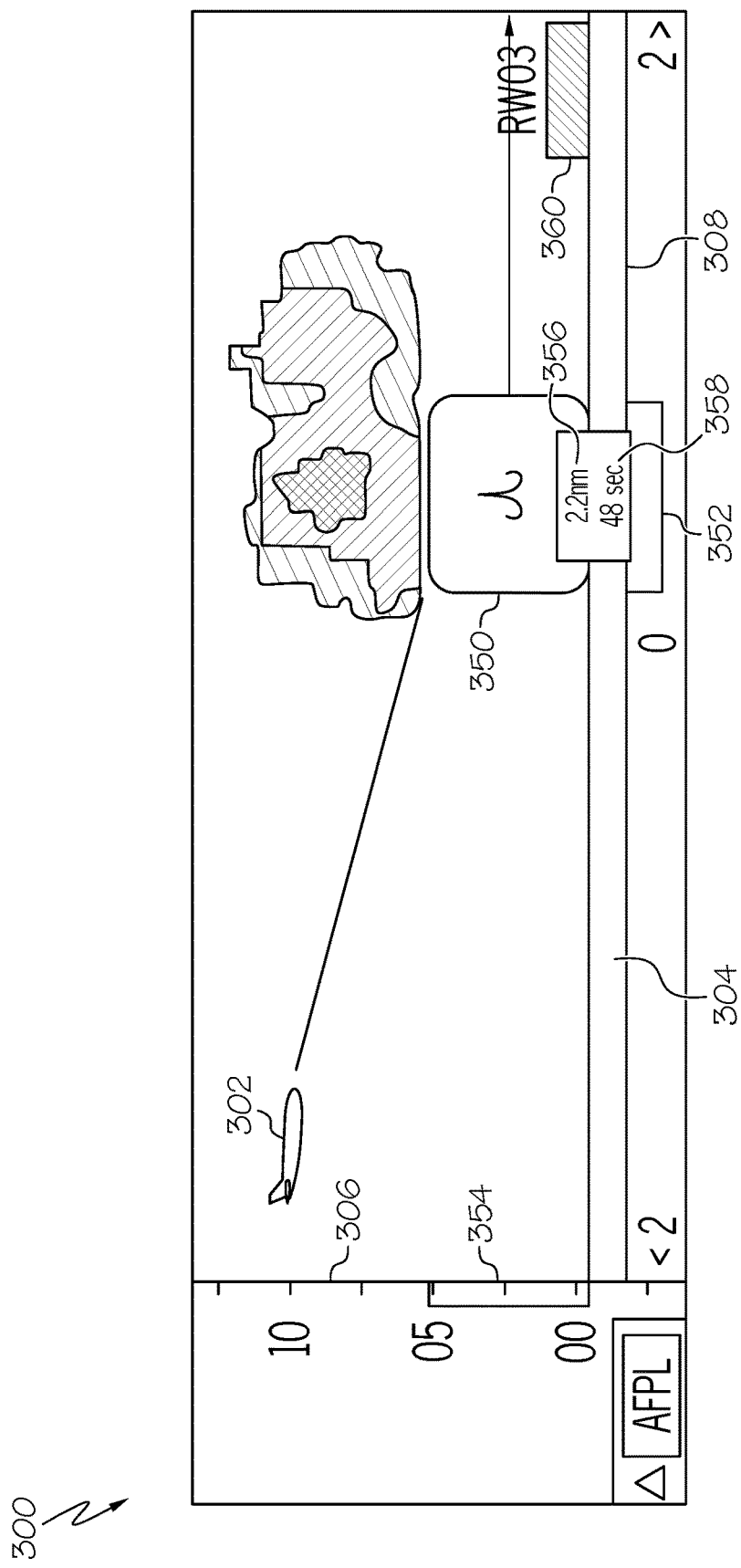
FIG. 3 is a second representative visual display generated by the aircraft system of FIG. 1 in accordance with an exemplary embodiment.

FIG. 3 is a further visual display 300 in the form of a vertical situation display view. As shown, the vertical situation display view 300 is a side or elevation view of the aircraft environment and is generally synchronized with the positional view on the display 200 of FIG. 2. As such, the vertical situation display view 300 includes graphical symbols representing the position of the aircraft 302 and terrain 304 relative to altitude 306, indicated on a vertical scale, and distance 308, indicated on a horizontal scale. Generally, any suitable type of aircraft and/or flight information may be presented on the vertical situation display view 300. In one exemplary embodiment, the vertical situation display view 300 provides various types of symbology representing wind shear.

In one exemplary embodiment, the vertical situation display view 300 includes a wind shear icon 350 representing the position, lateral size, and vertical size of the wind shear zone along the flight path. Additional symbology corresponding to the icon 350 representing lateral extent 352 may be depicted on the horizontal axis and representing vertical extent 354 may be depicted on the vertical axis. As conditions change, the sizes of the icon 350, lateral extent 352, and vertical extent 354 will change based on the activity volume of the wind shear zone. Similar to the display 200 of FIG. 2, the wind shear icon 350 may be colored to provide a threat level associated with the wind shear zone. For example, a yellow icon 350 may indicate that the wind shear zone has a medium intensity and/or is relatively far from the aircraft, and a red icon 350 may indicate that the wind shear zone has a severe intensity and/or is relatively close to the aircraft.

In accordance with a further exemplary embodiment, the vertical situation display view 300 may also provide wind shear symbology in the form of a distance indicator 356 and a time indicator 358 that represents the distance and time, respectively, between the current position of the aircraft and the wind shear zone. For example, in the depicted embodiment, the distance indicator 356 represents that the aircraft is 2.2 nm from the wind shear zone, and the time indicator 358 represents that the aircraft is 48 seconds from the wind shear zone. Further, as above, the wind shear symbology may include an arrow 360 representing a prediction regarding the future position of the wind shear zone.

Although a system 100 and visual displays 200, 300 are depicted in FIGS. 1-3, exemplary embodiments may additionally include a method for displaying wind shear information on an aircraft. As an example, and additionally referring to FIG. 1, the method may include accessing weather information from a volumetric buffer in database; identifying wind shear zones from the weather data; evaluating the coordinate data for the wind shear zones and converting the stored coordinate data into latitude, longitude, and altitude coordinates; determining the relative distances between the aircraft and the wind shear zones; and generating display commands to provide the information associated with the wind shear zones to the user on the display device.

Accordingly, exemplary embodiments display wind shear information in a manner that is intuitive and graphically integrated with other types of flight information on perspective, lateral, and vertical situation displays. Particularly, exemplary embodiments provide such symbology on various display views as a quick snapshot of the position, altitude, size, local air flows, and predicted locations. In general, such weather symbology facilitates flight crew or operator situational awareness and vehicle control, which reduces pilot or operator workload and navigation errors, and thus results in increased aircraft and/or navigation safety.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle system, comprising:
   a control unit comprising
      a weather module configured to receive weather data and to identify a wind shear zone at a location based on the weather data, the weather module further configured to generate wind shear coordinate data and wind shear characteristic data based on the weather data, and
      a display module configured to generate display commands based on the wind shear coordinate data and wind shear characteristic data from the weather module; and
   a display device coupled to receive the display commands from the control unit and configured to display a three-dimensional forward perspective view corresponding to a vehicle environment, the display device further configured to display first wind shear symbology within the view at a position that indicates the location of the wind shear zone, wherein the first wind shear symbology includes a generally conical three-dimensional wind shear icon, the generally conical three-dimensional wind shear icon having three-dimensional dimensions representative of a vertical and lateral size of the wind shear zone, the display device further configured to display second wind shear symbology within the view, the second wind shear symbology comprising at least one three-dimensional arrow indicating a direction of wind within the wind shear zone relative to the generally conical three-dimensional wind shear icon.

2. The vehicle system of claim 1, wherein the wind shear icon has a color that indicates a threat level.

3. The vehicle system of claim 1, wherein the display device is further configured to display third wind shear symbology representing an altitude of the wind shear zone on an altitude indicator.

4. The vehicle system of claim 1, wherein the second wind shear symbology includes a three-dimensional arrow to represent the local air flow direction within the wind shear zone in a horizontal orientation.

5. The vehicle system of claim 1 wherein the second wind shear symbology includes a three-dimensional arrow to represent the local air flow direction within the wind shear zone in a vertical orientation.

6. The vehicle system of claim 1, wherein the display device is further configured to display third wind shear symbology representing a predicted travel direction of the wind shear zone.

7. The vehicle system of claim 1, wherein the display device is further configured to display third wind shear symbology representing an evasive fly-to-zone based on the wind shear zone.

8. The vehicle system of claim 1, wherein the control unit further comprises a response module configured to generate autopilot commands based on the wind shear coordinate data and wind shear characteristic data from the weather module.

9. The vehicle system of claim 8, wherein the display device is further configured to display an autopilot annunciation associated with the autopilot commands.

10. The vehicle system of claim 8, wherein the display device is further configured to display at least one of a target altitude or a target speed associated with the autopilot commands.

11. A vehicle system, comprising:
a control unit comprising
    a weather module configured to receive weather data and to identify a wind shear zone at a location based on the weather data, the weather module further configured to generate wind shear coordinate data and wind shear characteristic data based on the weather data,
    a response module coupled to the weather module and configured to generate autopilot commands based on wind shear coordinate data and wind shear characteristic data, and
    a display module configured to generate display commands based on the wind shear coordinate data and wind shear characteristic data from the weather module; and
a display device coupled to receive the display commands from the control unit and configured to display a three-dimensional forward perspective view corresponding to a vehicle environment, the display device further configured to display first wind shear symbology within the view at a position that indicates the location of the wind shear zone, wherein the first wind shear symbology includes a generally conical three-dimensional wind shear icon, the generally conical three-dimensional wind shear icon having three-dimensional dimensions representative of a vertical and lateral size of the wind shear zone, the display device further configured to display second wind shear symbology within the view, the second wind shear symbology comprising at least one three-dimensional arrow indicating a direction of wind within the wind shear zone relative to the generally conical three-dimensional wind shear icon; and
an autopilot system coupled to the response module and configured to generate vehicle actuator commands based on the autopilot commands.

12. The vehicle system of claim 11, wherein the control unit further comprises a display module coupled to the weather module and configured to generate display commands representing the vehicle actuator commands associated with the wind shear coordinate data and wind shear characteristic data, and
wherein the vehicle system further comprises a display device coupled to receive the display commands from the display module and configured to display an autopilot annunciation based the display commands.

13. A vehicle system, comprising:
a control unit comprising
    a weather module configured to receive weather data and to identify a wind shear zone at a location based on the weather data, the weather module further configured to generate wind shear coordinate data and wind shear characteristic data based on the weather data, and
    a display module configured to generate display commands based on the wind shear coordinate data and wind shear characteristic data from the weather module; and
a display device coupled to receive the display commands from the control unit and configured to display a vertical situation display view that includes a horizontal axis representing distance, a vertical axis representing altitude, and first wind shear symbology along the horizontal axis and the vertical axis at a position that indicates the location of the wind shear zone, wherein the first wind shear symbology includes a generally conical three-dimensional wind shear icon, the generally conical three-dimensional wind shear icon having three-dimensional dimensions representative of a vertical and lateral size of the wind shear zone, the display device further configured to display second wind shear symbology within the view, the second wind shear symbology comprising at least one three-dimensional arrow indicating a direction of wind within the wind shear zone relative to the generally conical three-dimensional wind shear icon.

14. The vehicle system of claim 13, wherein the display device is further configured to display third wind shear symbology representing at least one of time or distance between a current position and the location of the wind shear zone.

15. The vehicle system of claim 13, wherein the display device is further configured to display third wind shear symbology representing at least one of a predicted travel direction of the wind shear zone or a current local air flow direction within the wind shear zone.

* * * * *